(12) United States Patent
Peterson

(10) Patent No.: US 10,544,882 B2
(45) Date of Patent: Jan. 28, 2020

(54) BAR EXTENSION SYSTEM

(71) Applicant: R.A. PHILLIPS INDUSTRIES, INC., Santa Fe Springs, CA (US)

(72) Inventor: Thomas Dale Peterson, Glendora, CA (US)

(73) Assignee: R.A. Phillips Industries, Inc., Santa Fe Springs, CA (US)

( * ) Notice: Subject to any disclaimer, the term of this patent is extended or adjusted under 35 U.S.C. 154(b) by 140 days.

(21) Appl. No.: 15/631,793

(22) Filed: Jun. 23, 2017

(65) Prior Publication Data

US 2018/0372245 A1    Dec. 27, 2018

(51) Int. Cl.
| | |
|---|---|
| *F16L 3/01* | (2006.01) |
| *F16L 3/015* | (2006.01) |
| *B66C 13/14* | (2006.01) |
| *H02G 11/00* | (2006.01) |
| *H01B 7/00* | (2006.01) |

(52) U.S. Cl.
CPC ............... *F16L 3/01* (2013.01); *B66C 13/14* (2013.01); *F16L 3/015* (2013.01); *H01B 7/0045* (2013.01); *H02G 11/00* (2013.01)

(58) Field of Classification Search
CPC ...... B66C 13/14; H01B 7/0045; H02G 11/00; F16L 3/015
USPC ..................................... 248/227.4, 235, 535
See application file for complete search history.

(56) References Cited

U.S. PATENT DOCUMENTS

| | | | | |
|---|---|---|---|---|
| 2,261,907 | A * | 11/1941 | Uecker | E04G 5/061 248/235 |
| 3,595,510 | A * | 7/1971 | Hutchinson | E04G 5/06 182/113 |
| 4,372,425 | A * | 2/1983 | Murphy | E04G 5/061 182/186.9 |
| 5,156,110 | A * | 10/1992 | Fuller | G09F 17/00 116/173 |
| 5,441,125 | A * | 8/1995 | Cook | E04G 3/20 182/82 |
| 5,503,358 | A * | 4/1996 | Lapp | E04G 3/20 182/82 |
| 5,535,974 | A * | 7/1996 | Savitski | E04G 5/062 248/246 |
| 6,003,630 | A * | 12/1999 | Whalen | E04G 3/20 182/82 |
| 6,098,566 | A * | 8/2000 | Metcalf | B63B 29/00 114/362 |
| 7,028,990 | B2 * | 4/2006 | Shorey | E04G 21/3214 248/135 |
| 8,196,705 | B2 * | 6/2012 | Jejina | E04G 1/38 182/150 |

(Continued)

*Primary Examiner* — Eret C McNichols
(74) *Attorney, Agent, or Firm* — Lewis Roca Rothgerber Christie LLP

(57) ABSTRACT

A bar extension system for supporting a suspended conduit in a vehicle and for engaging a tracker bar affixed to a mounting surface of the vehicle includes an extension arm extending away from the mounting surface of the vehicle and configured to support the suspended conduit, a bracket member coupled to the extension arm and configured to engage the tracker bar, a support arm coupled to the bracket member and angularly extending away from the bracket member and toward the mounting surface of the vehicle, and a support member coupled to the support arm and configured to press against the mounting surface of the vehicle.

16 Claims, 8 Drawing Sheets

(56) References Cited

U.S. PATENT DOCUMENTS

| | | | |
|---|---|---|---|
| 8,376,299 B2 * | 2/2013 | Burkman | A47G 1/16 |
| | | | 108/42 |
| 9,601,036 B2 * | 3/2017 | Barnard, IV | G09F 7/20 |
| 9,782,626 B2 * | 10/2017 | Wakefield, Jr. | A63B 27/02 |
| 10,093,449 B2 * | 10/2018 | Han | B65D 19/38 |
| 2005/0199441 A1 * | 9/2005 | Thery | E04G 3/20 |
| | | | 182/82 |
| 2008/0011920 A1 * | 1/2008 | Sloan | A47B 43/003 |
| | | | 248/235 |
| 2014/0090334 A1 * | 4/2014 | Darby | F16M 13/022 |
| | | | 52/741.1 |

\* cited by examiner

BAR EXTENSION SYSTEM

BACKGROUND

The present invention relates to the field of conduit management in tractor-trailer vehicles.

Tractor-trailer vehicles often have a number of electrical cables and hydraulic hoses extended between them that are secured at each end to relatively moving anchor points at the tractor and trailer. To keep such electrical cables and hydraulic hoses, which are henceforth generally referred to as conduits, away from the vehicle's moving parts, the flexible conduits are often dangled from a suspender coupled to a tracer/slider bar that is mounted to a back of a cab. However, while in operation, movements of the vehicle may cause the suspended conduits to strike the back of the cab, causing damage to the cab and, potentially, to the conduits.

Thus, what is desired is a conduit management system that can safely secure flexible conduits between the trailer and tractor while preventing damage.

The above information disclosed in this Background section is only for enhancement of understanding of the invention, and therefore it may contain information that does not form the prior art that is already known to a person of ordinary skill in the art

SUMMARY

Aspects of some embodiments of the present invention are directed toward a bar extension system that moves the suspension point of conduits (e.g., electrical cables, air hoses, and/or the like) away from an exterior of a vehicle (e.g., a tractor cab), thus preventing or reducing damage to the exterior surface of the vehicle. According to some embodiments, the bar extension system engages an existing tracker bar mounted on the exterior surface of the vehicle and rests against the exterior of the vehicle, thus eliminating the need for additional mounting hardware.

According to some embodiments of the present invention, there is provided a bar extension system for supporting a suspended conduit in a vehicle and for engaging a tracker bar affixed to a mounting surface of the vehicle, the tracker bar having a portion extending parallel to the mounting surface, the bar extension system including: an extension arm extending away from the mounting surface of the vehicle and configured to support the suspended conduit; a bracket member coupled to the extension arm and configured to engage the tracker bar; a support arm coupled to the bracket member and angularly extending away from the bracket member and toward the mounting surface of the vehicle; and a support member coupled to the support arm and configured to press against the mounting surface of the vehicle.

According to some embodiments of the present invention, there is provided a bar extension system for supporting a suspended conduit in a vehicle and for engaging a tracker bar affixed to a mounting surface of the vehicle, the tracker bar having a portion extending parallel to the mounting surface, the bar extension system including: an extension arm extending in a longitudinal direction away from the mounting surface of the vehicle and configured to support the suspended conduit; a bracket member coupled to the extension arm and including: a clamp extending in a lateral direction and configured to engage the tracker bar; a first socket portion extending longitudinally away from the clamp and having a first cavity, the first socket portion being configured to receive the extension arm within the first cavity; and a second socket portion projecting away from the clamp and toward the mounting surface of the vehicle, the second socket portion having a second cavity; a support arm coupled to the bracket member and configured to be received within the second cavity of the second socket portion; and a support member coupled to the support arm and including a support plate configured to press against the mounting surface of the vehicle, and further including a third socket portion having a third cavity, the third socket portion being configured to receive the support arm.

According to some embodiments of the present invention, there is provided a bar extension system for supporting a suspended conduit in a vehicle and for engaging a tracker bar affixed to a mounting surface of the vehicle, the tracker bar having a portion extending parallel to the mounting surface, the bar extension system including: an extension arm extending in a longitudinal direction away from a mounting surface of the vehicle and configured to support the suspended conduit; a bracket member coupled to the extension arm and including: a clamp configured to engage the tracker bar and including a first frame and one or more rollers rotatably mounted on to the first frame, the one or more rollers being configured to ride against the tracker bar; and a first socket portion extending longitudinally away from the clamp and having a first cavity, the first socket portion being configured to receive the extension arm within the first cavity; and a second socket portion projecting away from the clamp and toward the mounting surface of the vehicle, the second socket portion having a second cavity; a support arm coupled to the bracket member and configured to be received within the second cavity of the second socket portion; and a support member coupled to the support arm, the support member including: a second frame; a wheel rotatably mounted on to the second frame, the wheel being configured to press against the mounting surface of the vehicle; and a third socket portion coupled to the second frame and having a third cavity, the third socket portion being configured to receive the support arm.

According to some embodiments of the present invention, there is provided a bar extension system for supporting a suspended conduit in a vehicle and for engaging a tracker bar affixed to a mounting surface of the vehicle, the tracker bar having a portion extending parallel to the mounting surface, the bar extension system including: an extension arm extending in a longitudinal direction away from the mounting surface of the vehicle and configured to support the suspended conduit; a bracket member coupled to the extension arm and including: a clamp configured to engage the tracker bar and including a first frame and one or more rollers rotatably mounted on to the first frame, the one or more rollers being configured to ride against the tracker bar; and a first socket portion extending longitudinally away from the clamp and having a first cavity, the first socket portion being configured to receive the extension arm within the first cavity; and a second socket portion projecting away from the clamp and toward the mounting surface of the vehicle, the second socket portion having a second cavity; a support arm coupled to the bracket member and configured to be received within the second cavity of the second socket portion; and a support member coupled to the support arm, the support member including: a support plate; a third socket portion coupled to the support plate and having a third cavity, the third socket portion being configured to receive the support arm; and a carriage coupled to support plate.

BRIEF DESCRIPTION OF THE DRAWINGS

The accompanying drawings, together with the specification, illustrate exemplary embodiments of the present invention, and, together with the description, serve to explain aspects of embodiments of the present invention. In the drawings, like reference numerals are used throughout the figures to reference like features and components. The figures are not necessarily drawn to scale. The above and other features and aspects of the present invention will become more apparent from the following detailed description of illustrative embodiments thereof with reference to the attached drawings, in which.

DETAILED DESCRIPTION

The detailed description set forth below is intended as a description of example embodiments of a system and method for defect detection, provided in accordance with the present invention, and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Aspects of some embodiments of the invention are directed to a bar extension system that extends the air/electrical suspension mounting point away from an exterior of a vehicle (e.g., from the back of a tractor cab), preventing (or reducing) damage to exterior paint of the vehicle. In some embodiments, the bar extension system clamps onto the existing tracker/slider bar attached to the vehicle (e.g., attached to a back of a tractor cab) and rests against exterior of the vehicle, thus eliminating the need for mounting hardware.

Figure 1:
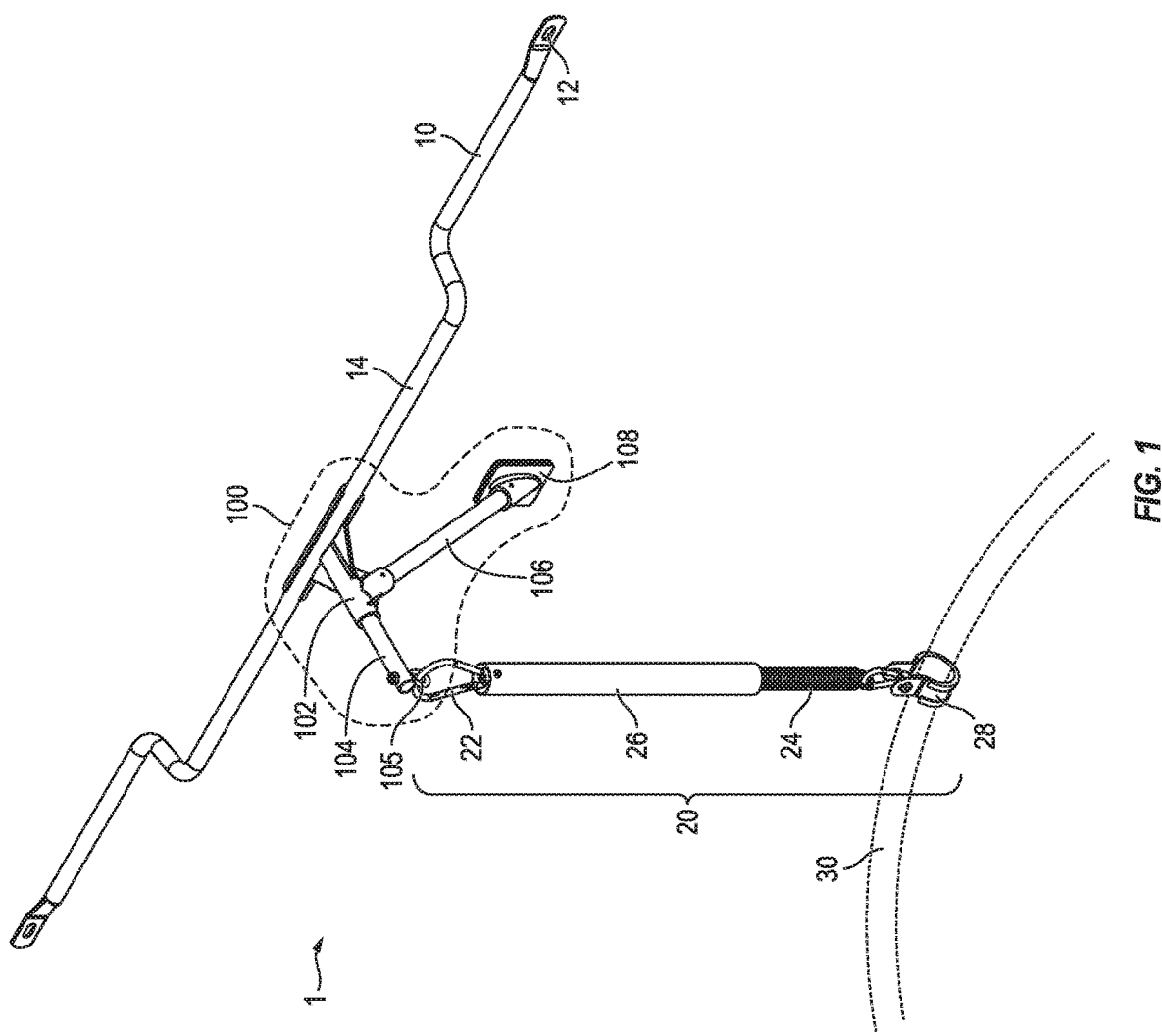
FIG. 1 is a schematic diagram of a conduit management system utilizing a bar extension system, according to some example embodiments of the present invention.

FIG. 1 is a schematic diagram of a conduit management system 1 utilizing a bar extension system 100, according to some example embodiments of the invention.

Referring to FIG. 1, the conduit management system 1 includes, in some embodiments, a tracker bar (also referred to as a slider bar) 10 affixed to a mounting surface of a vehicle (e.g., at the back of a tractor cab facing toward the trailer), a bar extension system (e.g., a tracker/slider bar extension) 100 coupled to the tracker bar 10 and extending away from the mounting surface (which may extend vertically) at the back of the vehicle, and a conduit suspender 20 for supporting suspended conduit assemblies (e.g., electrical cables, air hoses, and/or the like).

The tracker bar 10 includes a horizontal bar 14 (e.g., a bar that extends substantially parallel to the ground), which is offset from the mounting surface in a horizontal direction (e.g., in a direction substantially parallel to the ground). The tracker bar 10 may be attached to the vehicle by screws passing through mounting holes 12.

According to some embodiments, the bar extension system 100 includes a bracket member (e.g., a clamp bracket) 102, an extension arm (e.g., an extension bar or boom) 104, a support arm (e.g., a brace) 106, and a support member 108. The bracket member 102 couples the bar extension system 100 to the tracker bar 10 by engaging (e.g., clamping onto) the horizontal bar 14. The extension arm 104 extends outward from the bracket member 102 in a direction away from the mounting surface and orthogonal to (or substantially orthogonal to) the horizontal bar 14. The support member 108 rests against the mounting surface of the vehicle and together with the support arm 106 provides an upward force to the bracket member 102 that supports and maintains the extension arm 104 in a desired position, particularly when the end of the extension arm 104 is weighed down (or pulled down toward the ground) by an object, such as one or more suspended conduits (e.g., one or more electrical cables, air hoses, and/or the like) 30. The extension arm 104 may have an eyelet (or hook or any suitable securing mechanism) 105 coupled to (e.g., affixed to) an end thereof, which allows an object to be secured to and suspended from the extension arm 104.

The suspender 20 may include a clip (e.g., a snap-on clip) 22 for removably connecting the suspender 20 to the bar extension system 100 (e.g., to the extension arm 104), a spring (e.g., a coil spring) 24 coupled to the clip 22, a sleeve 26 covering (e.g., partially covering) the spring 24 and protecting it from the elements, and a conduit holder 28 coupled to the spring 24 and configured to support (e.g., hold) one or more conduits 30.

The bar extension system 100 allows one or more conduits 30 to be suspended further away from the mounting surface (i.e., further away from the back of the vehicle) than would otherwise be possible if the suspender 20 were coupled directly to the tracker bar 10, as is done conventionally. Thus, by increasing the horizontal distance (e.g., longitudinal distance along the X axis) between the back of the tractor and the point of suspension of the one or more conduits 30, the bar extension system 100 prevents or reduces the instances of the one or more conduits 30 hitting the back of the vehicle and damaging it (e.g., scratching or scuffing it) over time.

Figure 2A:
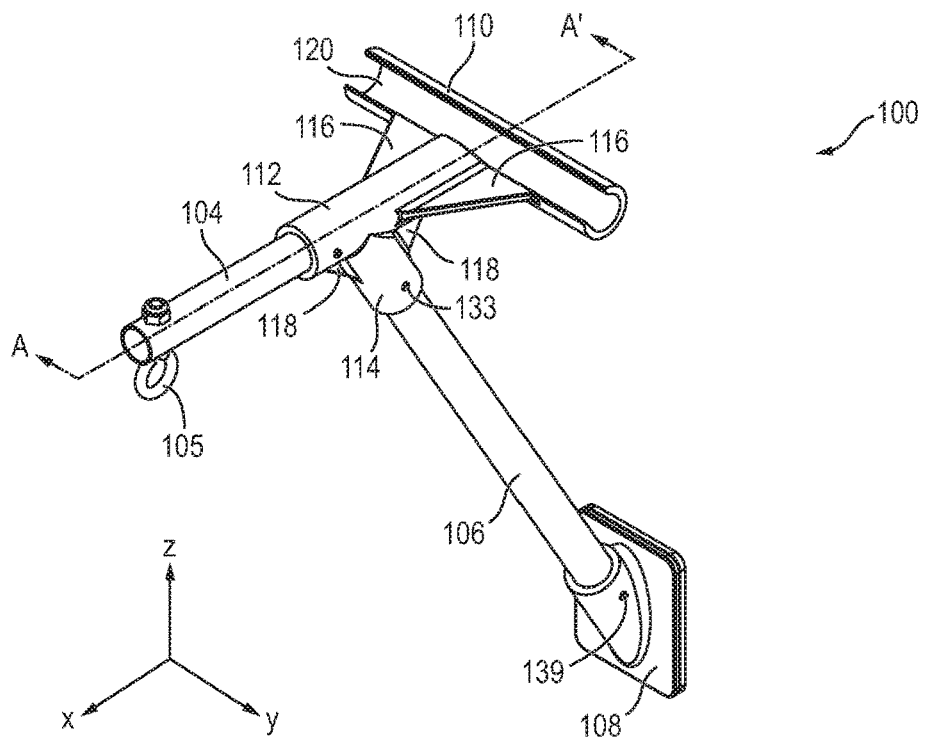
FIG. 2A illustrates a perspective view of the bar extension system.
Figure 2B:
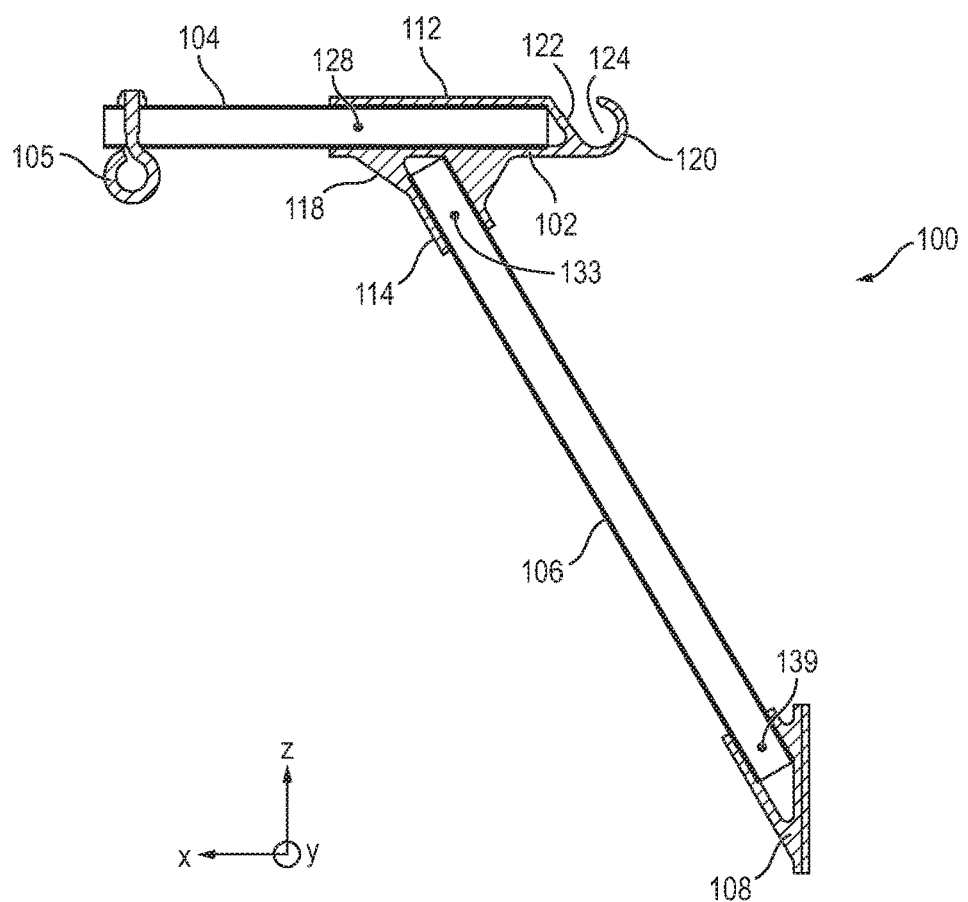
FIG. 2B illustrates a side cross-sectional view of the bar extension system taken along the line A-A' shown in FIG. 2A, according to some embodiments of the present invention.
Figure 3A:
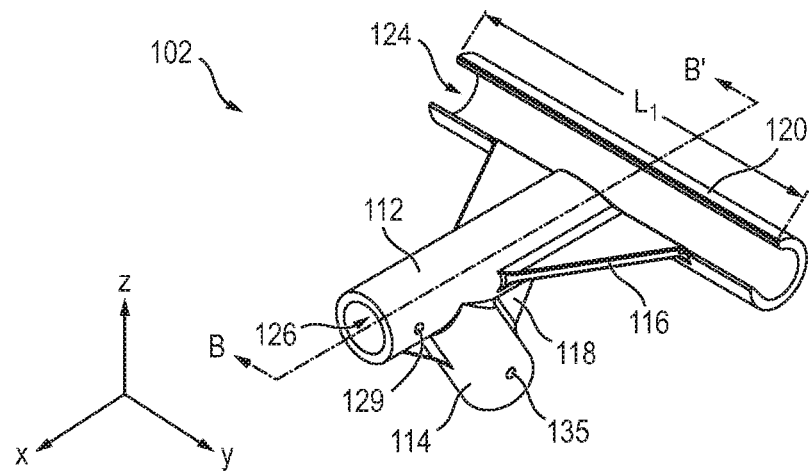
FIG. 3A illustrates a perspective view of a bracket member.
Figure 3B:
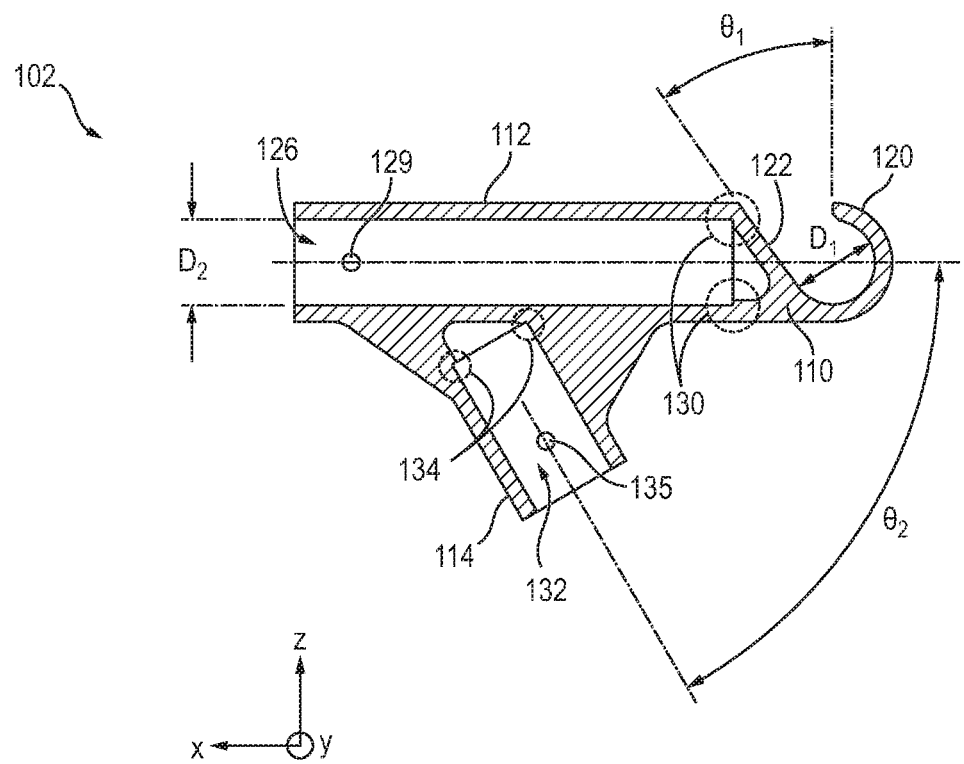
FIG. 3B illustrates a side cross-sectional view of the bracket member taken along the line B-B' shown in FIG. 3A, according to some embodiments of the present invention.
Figure 4A:
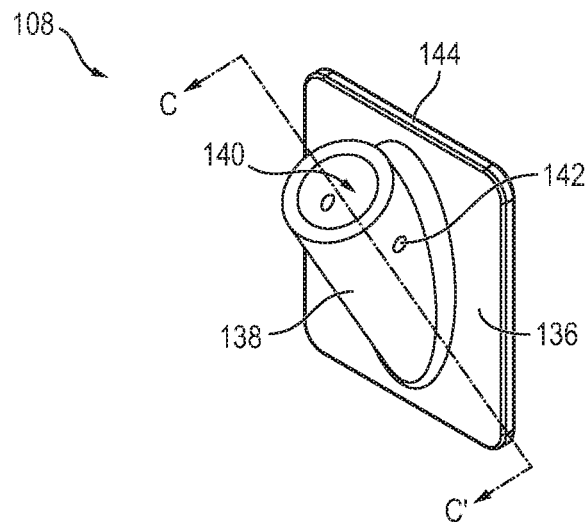
FIG. 4A illustrates a perspective view of a support member.
Figure 4B:
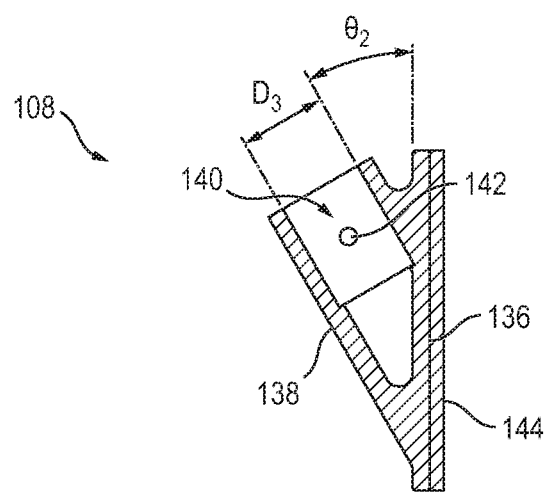
FIG. 4B illustrates a side cross-sectional view of the support member taken along the line C-C' shown in FIG. 4A, according to some embodiments of the invention.

FIG. 2A illustrates a perspective view of the bar extension system 100, and FIG. 2B illustrates a side cross-sectional view of the bar extension system 100 taken along the line A-A' shown in FIG. 2A, according to some embodiments of the invention. FIG. 3A illustrates a perspective view of the bracket member 102, and FIG. 3B illustrates a side cross-sectional view of the bracket member 102 taken along the line B-B' shown in FIG. 3A, according to some embodiments of the invention. FIG. 4A illustrates a perspective view of the support member 108, and FIG. 4B illustrates a side cross-sectional view of the support member 108 taken along the line C-C' shown in FIG. 4A, according to some embodiments of the invention.

Referring to FIGS. 2A-2B, the bracket member 102 includes, in some embodiments, a clamp portion 110 for engaging (e.g., clamping onto) the tracker bar 10, a first socket portion 112 extending away from (or attached to) the clamp portion 110 and configured to receive the extension arm 104, and a second socket portion 114 projecting generally vertically (e.g., generally downward) from the first socket portion 112, and configured to receive one end of the support arm 106.

In some embodiments, the bracket member 102 further includes a first gusset or a first pair of gussets (e.g., triangular plates) 116 at the junction of the clamp portion 110 and the first socket portion 112, and a second gusset or a second pair of gussets (e.g., triangular plates) 118 at the junction of the first socket portion 112 and the second socket portion 114. The first pair of gussets 116 may extend between the clamp portion 110 and opposite sides of the first socket portion 112 and serve to strengthen the connection between the clamp portion 110 and the first socket portion 112. The first pair of gussets 116 may reside on (e.g., be aligned with) a horizontal/transverse plane (e.g., an X-Y plane) passing through a longitudinal axis of the first cavity 126. The second pair of gussets 118 may extend between the first socket portion 112 and the second socket portion 114 and be utilized to strengthen the connection between the first and second socket portions 112 and 114. The second pair of gussets 118 may reside on (e.g., be aligned with) a vertical plane (e.g., an X-Z plane) passing through a central axis of the first cavity 126. In some examples, the first and second pairs of gussets 116 and 118 may be substantially triangular in shape and may be structurally integrated with the rest of the bracket member 102 by, for example, molding. However, embodiments of the present invention are not limited thereto, and the first and second pairs of gussets 116 and 118 may have any suitable shape and be fastened to the clamp portion 110 and the first and second socket portions 112 and 114 by bolts, rivets, welding, and/or any other suitable fastening mechanism.

Referring to FIGS. 2B and 3B, in some embodiments, the clamp portion 110 has an arcuate lip 120 curvedly extending from a guiding portion 122, which acts as a partial sleeve capable of wrapping around (e.g., partially wrapping around) the horizontal bar 10. The guiding portion 122 and the arcuate lip 120 define a channel (or a lateral opening) 124 therebetween, within which the clamp portion 110 engages the tracker bar 10 (e.g., for engaging the horizontal bar 14). As shown in FIG. 2C, the arcuate lip 120 may have a semi-circular cross-sectional profile (e.g., along a vertical plane) with an inner diameter that matches or substantially matches the outer diameter of the horizontal bar 14. The arcuate lip 120 curves around and grips (e.g., tightly grips) the tracker bar 10 to restrict (e.g., prevent) outward movement (e.g., along the longitudinal direction or X axis) of the clamp portion 110 relative to the horizontal bar 14.

In some embodiments, the guiding portion 122 may be flat and angled relative to the longitudinal axis of the first socket portion 112 (e.g., angled with respect to the horizontal/transverse plane, e.g., the X-Y plane) to allow the clamp portion 110 to smoothly receive the horizontal bar 14, which may slide into the channel 124 upon application of an external force. However, embodiments of the invention are not limited thereto, and the guiding portion may have any suitable portion. For example, the guiding portion 122 may be concave in shape, with its inward curve facing the arcuate lip 120.

In some embodiments, the arcuate lip 120 is designed such that the tip of the arcuate lip 120 and the guiding portion (e.g., the flat portion) 122 form a gap therebetween that is less than the outer diameter of the horizontal bar 14, when not under external pressure. However, the arcuate lip 120 is flexible enough for the gap to open to the diameter of the horizontal bar 14, when applied with sufficient force. Thus, by pressing the horizontal bar 14 against the gap and by applying sufficient external force, the tip of the arcuate lip 120 may deflect outwardly to allow the horizontal bar 14 to be received within the channel 124. After fully receiving the horizontal bar 14 within the channel 124, the tip of the arcuate lip 120 may return to its original position, thus preventing the horizontal bar 14 from escape (or being released from) the channel 124 without the application of an external force to the horizontal bar 14 along the incline direction of the guide portion 122. As a result, the clamp portion 110 may be securely coupled to (e.g., attached to) the horizontal bar 14.

According to some embodiments, the first socket portion 112 extends in a longitudinal direction away from the mounting surface of the vehicle, and is configured to receive the extension arm 104 within its hollow interior, the first cavity 126 (shown in FIG. 3). In some examples, the first cavity 126 may be cylindrical in shape and have an internal diameter that matches or substantially matches the outer diameter of the extension arm 104. However, embodiments of the invention are not limited thereto, and the extension arm 104 and the corresponding first cavity 126 may have any suitable shape, e.g., a rectangular cuboid, a prism, and/or the like. As such, when the extension arm 104 is inserted into the first socket portion 112, the extension arm 104 makes close contact with the interior walls of the first cavity 126, which limits movement of the extension arm 104 within the first socket portion 112 to a sliding motion along the longitudinal direction (e.g., the X axis). In some examples, the sliding movement of the extension arm 104 (e.g., along the longitudinal direction), as well as its roll about the longitudinal axis of the extension arm 104, may be restricted (e.g., prevented) by passing a first pin (e.g., a roll pin) 128 through a first hole (e.g., a pin hole) 129 extending through the first socket portion 112 and the extension arm 104; however, embodiments of the invention are not limited thereto, and the bar extension may be secured to (e.g., attached to) the first socket portion using an adhesive, an interference fit (e.g., a friction fit), or any other suitable attachment mechanism, such as a clevis, rivet, screw, crimp, swage, and/or the like. In some examples, the first hole 129 may extend in a transverse direction (e.g., the Y direction), as shown in FIGS. 3A and 3B; however, embodiments of the invention are not limited thereto, and the first hole 129 may extend along a vertical direction (e.g., the Z direction) or any other suitable direction.

In some examples, the first socket portion 112 may have a first stopper 130 within the first cavity 126 of the first socket portion 112, which serves to limit the insertion length of the extension arm 104 within the first socket portion 112. The first stopper 130 may be a protrusion (e.g., a protruding rim), a wall that bears against the end point of the extension arm 104, and/or the like. Increasing the insertion length of the extension arm 104 inside the first socket portion 112 may increase the structural support provided by the bracket member 102 to the extension arm 104 and improve the ability of the bar extension system 100 to support greater suspension load (which may be suspended from the extension arm 104, e.g., via the eyelet 105).

In some embodiments, the second socket portion 114 projects downward from the first socket portion 112 at an angle with respect to the horizontal/transverse plane (e.g., the X-Y plane), and may be configured to receive a first end of support arm 106. The second socket portion 114 may be configured in the same or substantially the same manner as the first socket portion 112, except that the second cavity 132 of the second socket portion 114 may be shorter than the first cavity 126 of the first socket portion 112. That is, the insertion length of the support arm 106 may be lower than that of the extension arm 104. Similar to the first socket portion 112, in some examples, the second socket portion 114 may have a second stopper 134 within the second cavity 132, which serves to limit the insertion length of the support arm 106 within the second socket portion 114. The support arm 106 may be secured to the second socket portion by passing a second pin (e.g., a roll pin) 133 through a second hole (e.g., a pin hole) 135 extending through the second socket portion 114 and the support arm 106; however, embodiments of the invention are not limited thereto, and the bar extension may be secured to (e.g., attached to) the first socket portion using an adhesive or any other suitable attachment mechanism. In some examples, the second hole 135 may extend in a transverse direction (e.g., the Y direction) or any other suitable direction. As the first socket portion 112 has been described above, a full description of the second socket portion 114 may not be repeated herein.

Referring to FIGS. 3A and 3B, the length $L_1$ of the clamp portion 110, as measured along the axis of curvature of the arcuate lip 120 (i.e., along the lateral or Y direction), is less than the length of the horizontal bar 14 but long enough to provide roll stability (e.g., prevent rolling) about the longitudinal axis of the first socket portion 112 (i.e., the X axis). In some examples, the length $L_1$ of the clamp portion 110 may be about 4 inches to about 20 inches (e.g., about 6 inches). The diameter $D_1$ of the channel 124 may match (e.g., substantially match) the outer diameter of the horizontal bar 14, and be about 0.75 inches or 1 inch, in some examples. The incline angle $\Theta_1$ of the flat portion 122 of the clamp portion 110 may be about 0 degree to about 60 degrees (e.g., about 30 degrees) with respect to a vertical axis (i.e., the Z direction).

The inner diameter of the first and second socket portions 112 and 114 (corresponding to the first and second cavities 126 and 132) may match or substantially match the outer diameter of the extension arm 104 and the support arm 106, respectively. In some examples, the inner diameter $D_2$ of both of the first and second socket portions 112 and 114 may be about 0.7 to about 0.8 inches (e.g., 0.76 or 0.785 inches). The insertion length of the first socket portion 112 may, for example, be about 4 inches to about 6 inches. The insertion length of the second socket portion 114 may be, for example, about 1 inch to about 3 inches. The second socket portion 114 may project from the first socket portion 112 at an angle $\Theta_2$ of about 30 degrees to about 70 degrees (e.g., about 60 degrees) with respect to a horizontal/transverse plane (e.g., the X-Y plane).

In some examples, the extension arm 104 may have a length of about 12 inches to about 18 inches; however, embodiments of the invention are not limited thereto, and the extension arm 104 may have any length suitable for a desired application.

However, embodiments of the invention are not limited to the measurements provided above, and any suitable dimensions may be selected depending on, for example, the materials used and the suspension load for which the bar extension system 100 is designed.

Referring to FIGS. 4A and 4B, the support member 108 includes, in some embodiments, a support plate 136 that abuts against the mounting surface of the vehicle and a third socket portion 138 projecting upward from the support plate 136 at an angle $\Theta_2$ that may be about 30 degrees to about 70 degrees (e.g., about 60 degrees) with respect to a horizontal/transverse plane (e.g., the X-Y plane).

An end of the support arm 106 may be inserted within a third cavity 140 of the third socket portion 138. The support arm 106 may be fastened to the third socket portion 138 by passing a third pin (e.g., a roller pin) 139 through a third hole 142 that extends through the third socket portion 138 and a corresponding hole through the support arm 106; however, embodiments of the invention are not limited thereto, and the support arm 106 may be fastened to the third socket portion 138 using an adhesive or any other suitable attachment mechanism. In some examples, the third hole 142 may extend in a transverse direction (e.g., the Y direction), as shown in FIGS. 4A and 4B, or any other suitable direction.

In some examples, the support plate 136 may be about 2 inches to about 6 inches (e.g., about 2.5 inches) in width (e.g., as measured along the Y axis), and be about 2 inches to about 6 inches (e.g., about 3 inches) in height (e.g., as measured along the Z axis).

As the third socket portion 138 may be configured to be the same or substantially the same as the first socket portion 112, further description thereof may not be repeated herein.

When the extension arm 102 supports a load (e.g., a weight), the support arm 106 presses the support member 108 against the mounting surface of the vehicle, thus providing sufficient torque to counterbalance the effect of the load suspended from an end of the extension arm 102.

In some embodiments, a pad (e.g., an adhesive-back foam pad) 144 may be attached to (e.g., adhered to) a back side of the support plate 136 that faces the mounting surface of the vehicle. The pad 144 may prevent or substantially prevent the support member 108 from damaging (e.g., scratching/scuffing) the mounting surface of the vehicle. The pad 144 may be made of, for example, ethylene-propylene copolymer rubber (EPM), polyethylene foam, and/or any other suitable material. However, embodiments of the invention are not limited thereto, and in some examples, the support plate may be fastened to the mounting surface of the vehicle by a fastening means such as a bolt or rivet.

In embodiments in which the pad 144 is utilized, friction between the pad and mounting surface of the vehicle, together with the friction between the clamp portion 110 and the tracker bar 10 may restrict (e.g., prevent) the bar extension system 100 from sliding laterally in the tracker bar 10.

According to some examples, the bracket member 102 and the support member 108 may be made of a suitable material that provides sufficient rigidity and resistance against heat, ultraviolet light, and corrosion, such as nylon, glass-filled nylon, acetal resin, high-density polyethylene (HDPE), Acrylonitrile butadiene styrene (ABS), polycarbonate, and/or the like.

Each of the bracket member 102 and the support member 108 may be integrally molded as a single component, or may be formed as separate components that are subsequently joined together by melting the materials or by using an adhesive or other mechanical attachment mechanism.

In some examples, the extension arm 104, the support arm 106, and the eyelet 105 may be made of any suitable rigid material, such as stainless steel, zinc-plated steel, carbon fiber, and/or the like.

While FIGS. 1 through 4B illustrate an embodiment in which the bar extension system employs a single support arm 106 and support member 108, embodiments of the invention are not limited thereto. For example, two or more support arm and bracket combinations may be connected to the first socket portion 112 by one or more second socket portions, and make contact with the mounting surface of the vehicle at two or more separate points. That is, the two or more support arm and bracket combinations have a non-zero angle therebetween.

Figure 5:
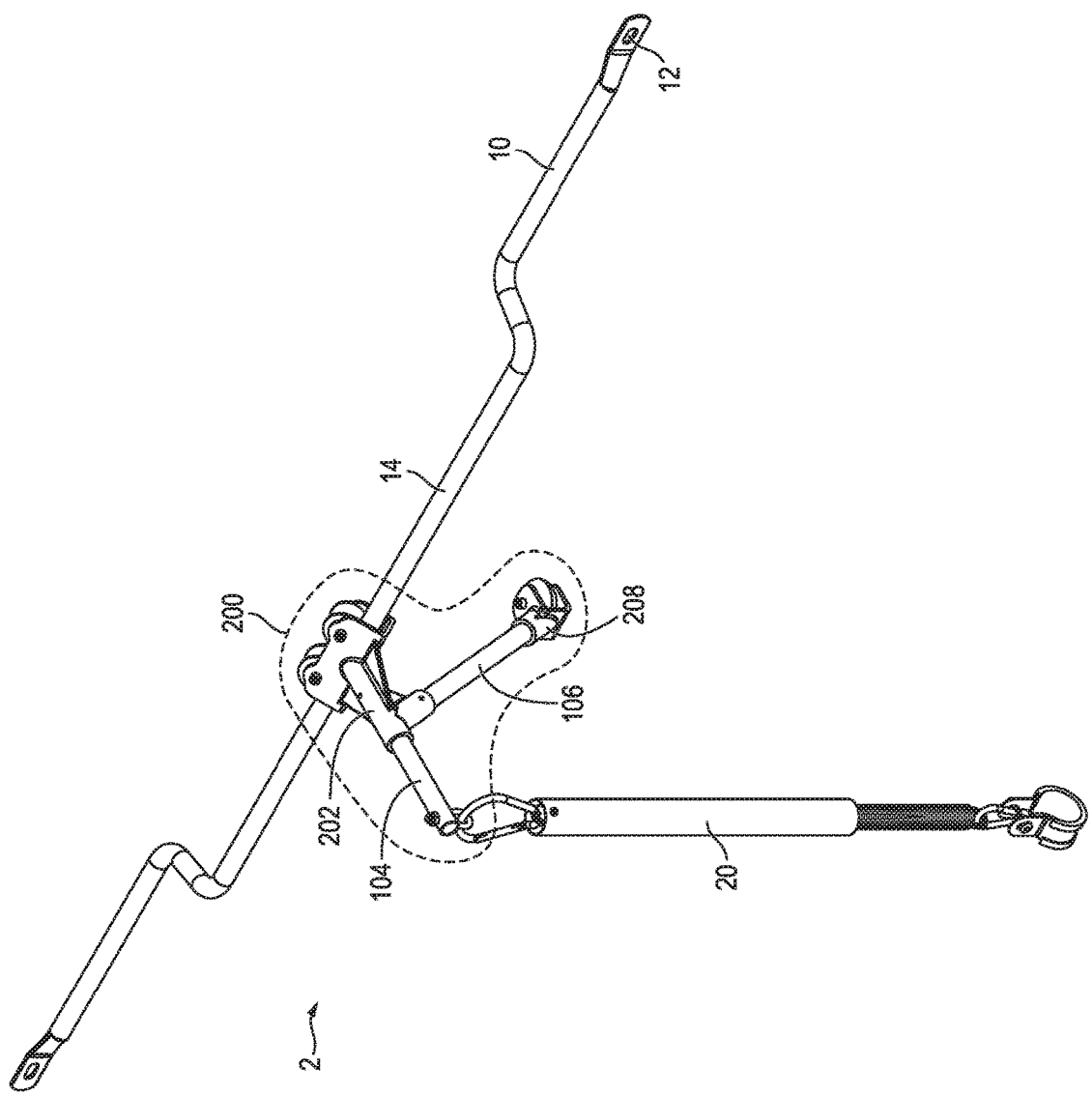
FIG. 5 is a schematic diagram of a conduit management system utilizing a bar extension system, according to some example embodiments of the invention.

FIG. 5 is a schematic diagram of a conduit management system 2 utilizing a bar extension system 200, according to some example embodiments of the invention.

Referring to FIG. 5, the conduit management system 2 may be the same or substantially the same as the conduit management system 1, except for the bar extension system 200, which has a number of differences with the bar extension system 100. The bar extension system 200 is substantially the same as the bar extension system 100, except for the bracket member 202 and the support member 208, as will be detailed further below. The bracket member 202 and the support member 208 provide a dynamic configuration for the bar extension system 200 that allows for linear motion of the bar extension system 300 along a lateral direction (e.g., the Y direction) on the mounting surface of the vehicle. Allowing the bar extension system 200 to traverse back and forth along the cab as the vehicle makes turns may reduce strain on the one or more conduits 30 coupled to the bar extension system 200. Further, the working length of the one or more conduits 30 may become less critical, and the operator may potentially use shorter conduits 30 without risk of over-extension.

Figure 6A:
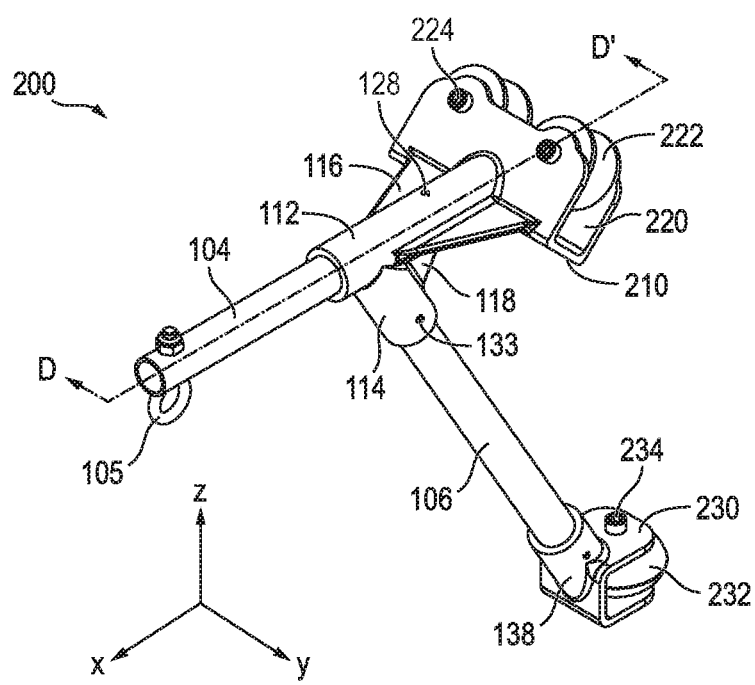
FIG. 6A illustrates a perspective view of the bar extension system.
Figure 6B:
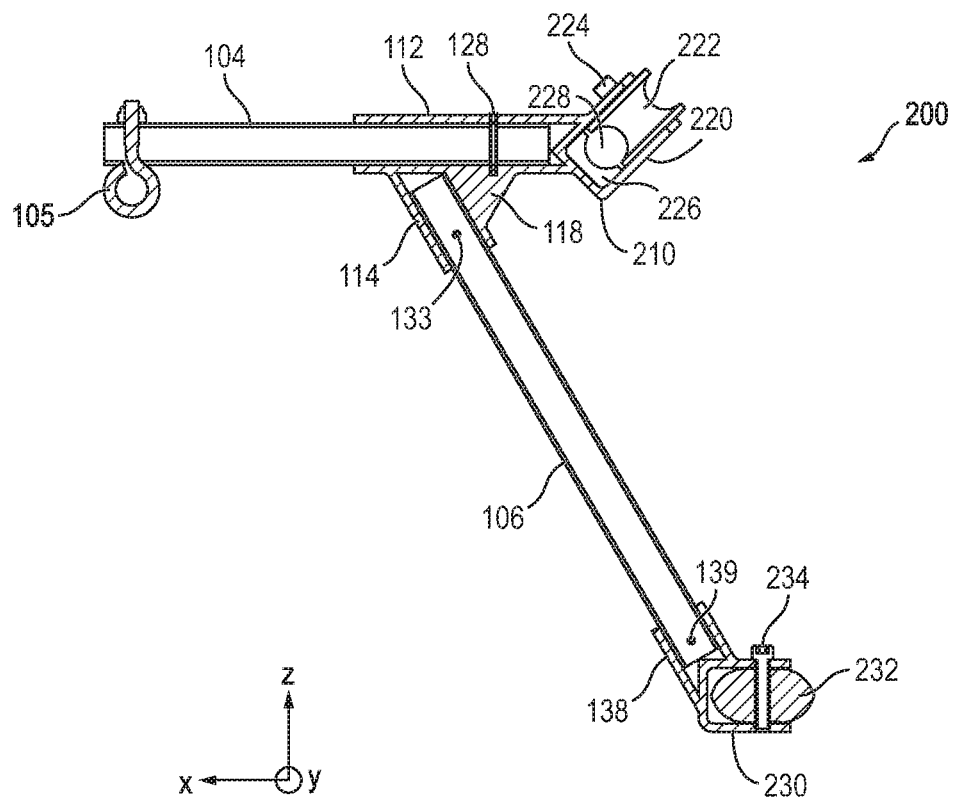
FIG. 6B illustrates a side cross-sectional view of the bar extension system taken along the line D-D' shown in FIG. 6A, according to other embodiments of the invention.

FIG. 6A illustrates a perspective view of the bar extension system 200, and FIG. 6B illustrates a side cross-sectional view of the bar extension system 200 taken along the line D-D' shown in FIG. 6A, according to some embodiments of the invention.

Referring to FIGS. 6A-6B, the bracket member (e.g., roller bracket) 202 may be substantially the same as the bracket member 102, except for the clamp portion 210, which is coupled to the first socket portion 112 and engages the horizontal bar 14. According to some embodiments, the clamp portion 210 has a first frame (e.g., a U-shaped roller mounting frame) 220 that partially encases one or more rollers (e.g., a pair of concave guide rollers) 222 therebetween. The one or more rollers 222 are rotatably mounted on to the first frame 220 via one or more corresponding roller axles 224. In some embodiments, the one or more rollers 222 may be concave in shape, with their inward curves facing a concave portion 226 at the base of the first frame 220. The concave shape of the one or more rollers 222 and the concave portion 226 may define a cavity within which to guide the horizontal bar 14. In some examples, the radii of curvature of the one or more rollers 222 and the concave portion 226 may correspond to (e.g., match or substantially match) the radius of curvature of the horizontal bar 14, thus making the one or more rollers 224 especially suitable for side guiding, and riding against the outer diameter of, the tracker bar 10.

As illustrated in FIGS. 5 and 6A-6B, in some examples, the one or more rollers 222 includes a pair of concave guide rollers; however, embodiments of the invention are not limited thereto, and the one or more rollers 222 may include any suitable number of rollers. As would be understood by a person of ordinary skill in the art, a greater number of rollers may provide better roll stability about the longitudinal axis (e.g., the X axis) of the first socket portion 112. Further, while FIGS. 5, 6A and 6B illustrate the rollers 220 being concave, embodiments of the present invention are not limited thereto, and the one or more rollers 220 may have any suitable shape, such as U-shaped or V-shaped.

According to some embodiments, sidewalls of the first frame 220 (and hence the one or more roller axles 224) may be inclined at an angle with respect to the horizontal plane. In some examples, the angle of incline of the first frame 220 may be about 20 degrees to about 45 degrees (e.g., about 30 degrees) with respect to the horizontal/transverse plane. FIGS. 5, 6A and 6B illustrate the first frame 220 as being angles upward away from the support member 208, however, the first frame 220 may also be angled downward toward the support member 208, according to some embodiments. The angle of incline may be such that the point of contact of the horizontal bar 14 with each of the one or more rollers 222 may be at or near the vertex (i.e., the geometric center) of their curvature, which may also be the point at the periphery of each of the one or more rollers 222 that is closest to its center of mass. This may allow for equal distribution of force among both sidewalls of the first frame 220, which may improve the structural integrity of the bracket member 202 and increase the maximum load that may be supported by the bar extension system 200.

In some embodiments, the support member (e.g., roller bracket) 208 has a second frame (e.g., a U-shaped wheel mounting frame) 230 that is attached to the third socket portion 138 and partially encases a wheel 232 therebetween. The wheel 232 is rotatably mounted on to the second frame 230 via a wheel axle 234. In some embodiments, the wheel 232 may be convex in shape. According to some embodiments, when the bar extension system 200 is attached to the tracker bar 10 and supporting a load, sidewalls of the second frame 230 may be parallel or substantially parallel to the horizontal/transverse plane (i.e., the wheel axle 234 may be perpendicular or substantially orthogonal to the horizontal plane or be oriented in the Y direction).

In some examples, the one or more rollers 222 may have a diameter of about 1.5 inches and an axial thickness of about 1 inch, and the wheel 232 may have a diameter of about 1.85 inches and an axial thickness of about 1.5 inches to about 2.0 inches (e.g., 1.5 inches). According to some examples, the one or more rollers 222 may be made of acetal homopolymer resin, which offers low friction, high wear resistance, and great stiffness and strength; however, embodiments of the invention are not limited thereto, and any suitable material may be used. In some examples, the wheel 232 may be made of non-marring polyurethane and/or any other suitable material.

Figure 7:
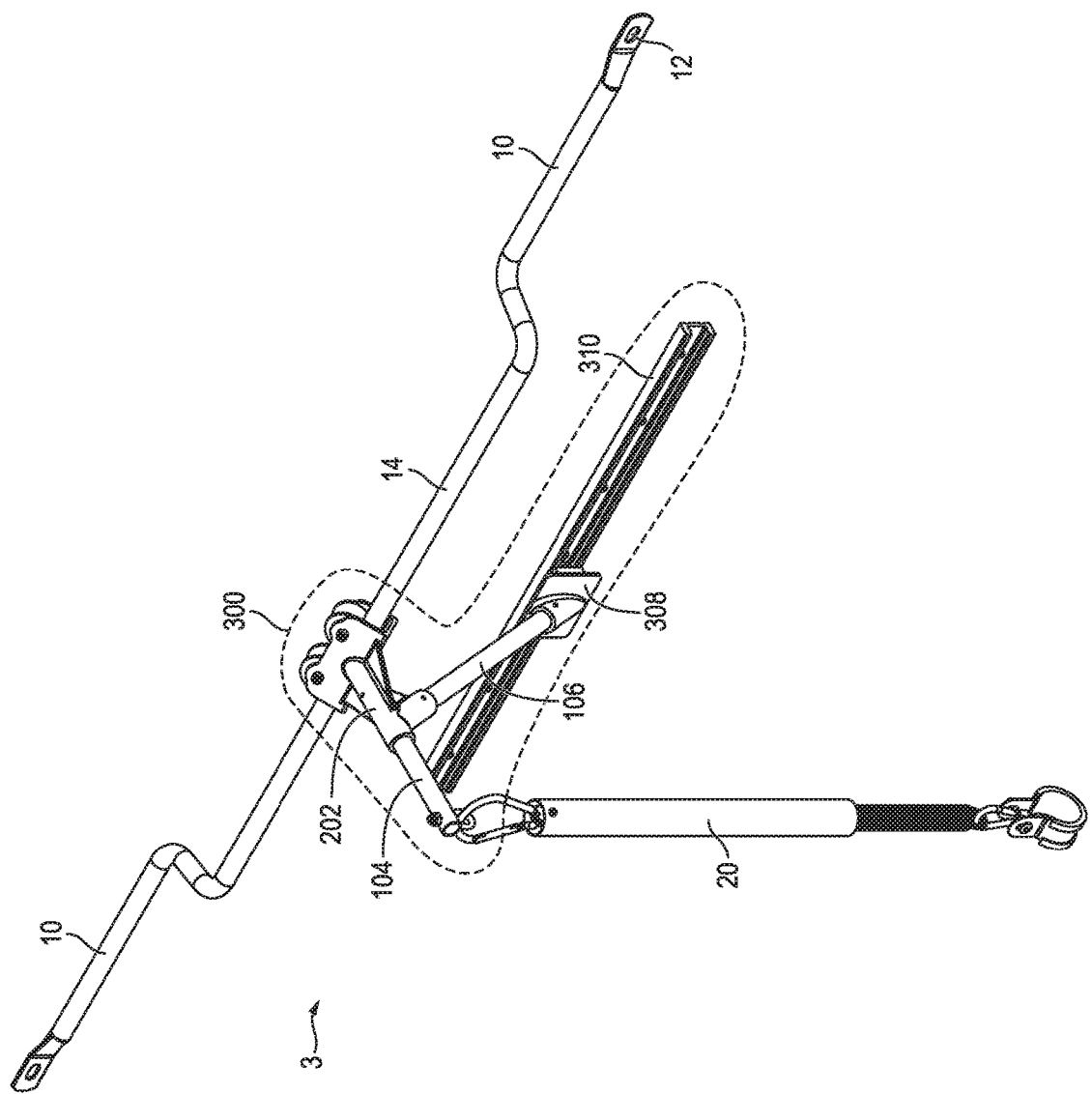
FIG. 7 is a schematic diagram of a conduit management system utilizing a bar extension system, according to yet other example embodiments of the invention.

FIG. 7 is a schematic diagram of a conduit management system 3 utilizing a bar extension system 300, according to some example embodiments of the invention.

Referring to FIG. 7, the conduit management system 3 may be the same or substantially the same as the conduit management system 2, except for the bar extension system 300, which has a number of differences with the bar extension system 200. The bar extension system 300 is substantially the same as the bar extension system 200, except for the support member 308 and the guide rail 310, as will be detailed further below. Similar to the bar extension system 200, the bracket member 202 together with the support member 308 and guide rail 310 provide another dynamic configuration for the bar extension system 300 that allows for linear motion of the bar extension system 300 along a lateral direction (e.g., the Y direction) on the mounting surface of the vehicle.

Figure 8A:
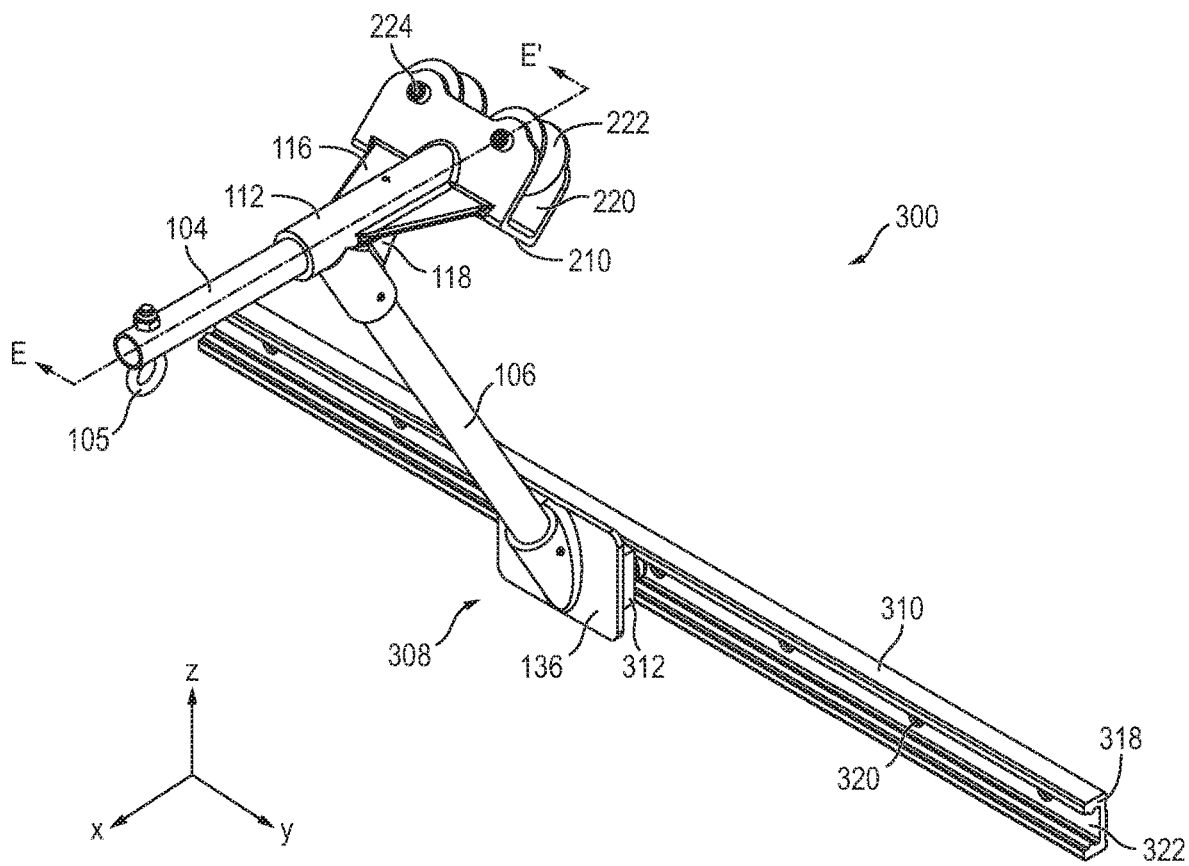
FIG. 8A illustrates a perspective view of the bar extension system.
Figure 8B:
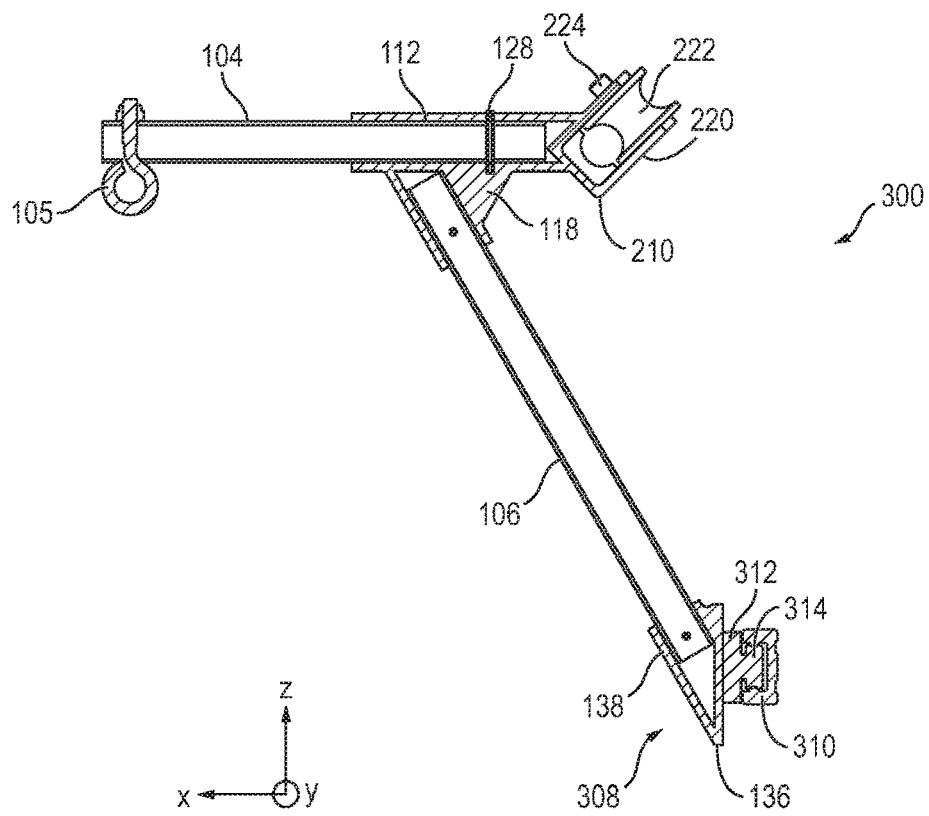
FIG. 8B illustrates a side cross-sectional view of the bar extension system taken along the line E-E' shown in FIG. 8A, according to some embodiments of the invention.

FIG. 8A illustrates a perspective view of the bar extension system 300, and FIG. 8B illustrates a side cross-sectional view of the bar extension system 300 taken along the line E-E' shown in FIG. 8A, according to some embodiments of the invention.

Referring to FIGS. 8A-8B, according to some embodiments, the support member (e.g., carriage bracket) 308 includes a carriage (e.g., a linear carriage or a linear roller carriage) 312 attached to a surface of the support plate 136 that faces the mounting surface of the vehicle (i.e., a surface of the support plate 136 opposite the third socket portion 138). The carriage 312 is supported by and traverses along the guide rail (e.g., a linear guide/carriage rail) 310. The carriage 312 may have one or more carriage rollers 314 that fit within and glide against tracks 318 of the guide rail 310.

In some embodiments, the guide rail 310 is attached to (e.g., fixed to or mounted on to) the mounting surface of the vehicle (e.g., the back of the tractor cab), for example, by a set of screws passing through mounting holes 320 along a length of a groove 322 of the guide rail 310. However, embodiments of the invention are not limited thereto, and the guide rail 310 may be attached to the mounting surface via any suitable attachment mechanism, such as an adhesive, bolts, rivets, welding, molding, and/or the like.

As described above, the bar extension system, according to the various embodiments of the invention, maintains the suspended conduits away from the driveline and any moving components, for example, between the trailer and tractor, and allow for greater clearance between the suspended conduits and an exterior wall of the vehicle (e.g., the back wall of the tractor cab), which prevents or limits damage to the vehicle exterior due to dangling conduits striking or scuffing the exterior.

While this invention has been described in detail with particular references to exemplary embodiments thereof, the embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention, as set forth in the following claims and equivalents thereof.

It will be understood that, although the terms "first", "second", "third", etc., may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section, without departing from the spirit and scope of the inventive concept.

The terminology used herein is for the purpose of describing particular embodiments and is not intended to be limiting of the inventive concept. As used herein, the singular forms "a" and "an" are intended to include the plural forms as well, unless the context clearly indicates otherwise. It will be further understood that the terms "include", "including", "comprises", and/or "comprising", when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items. Expressions such as "at least one of", when preceding a list of elements, modify the entire list of elements and do not modify the individual elements of the list. Further, the use of "may" when describing embodiments of the inventive concept refers to "one or more embodiments of the inventive concept". Also, the term "exemplary" is intended to refer to an example or illustration.

It will be understood that when an element or layer is referred to as being "on", "connected to", "coupled to", or "adjacent to" another element or layer, it can be directly on, connected to, coupled to, or adjacent to the other element or layer, or one or more intervening elements or layers may be present. When an element or layer is referred to as being "directly on", "directly connected to", "directly coupled to", or "immediately adjacent to" another element or layer, there are no intervening elements or layers present.

As used herein, the terms "use", "using", and "used" may be considered synonymous with the terms "utilize", "utilizing", and "utilized", respectively.

LISTING OF SOME OF THE REFERENCE NUMERALS 1, 2, 3: Conduit management system
10: Tracker/slider bar
12: Mounting holes
14: Horizontal bar
20: Suspender
22: Clip
24: Spring
26: Sleeve
28: Conduits holder
30: Conduits
100, 200, 300: Bar extension system
102: Bracket member (clamp bracket)
104: Extension arm
105: Eyelet
106: Support arm
108: Support member
110, 210: Clamp portion
112, 114, 138: First, second, and third socket portions
116, 118: First and second pair of gussets
120: Arcuate lip of the clamp portion 110
122: Guiding portion of the clamp portion 110
124: Channel
126, 132, 140: First, second, and third cavities
128, 133, 139: First, second, and third pins
130: First stopper
134: Second stopper
136: Support plate
129, 135, 142: First, second, and third holes
144: Pad
202: Bracket member (roller bracket)
208: Support member (wheel bracket)
220, 230: First and second frames
222: Roller
224: Roller axle
226: Concave portion of the frame 220
232: Wheel
234: Wheel axle
308: support member (carriage bracket)
310: Guide rail
312: Carriage 314: Carriage rollers
318: Tracks of the guide rail 310
322: Groove of the guide rail 310

What is claimed is:

1. A bar extension system for supporting a suspended conduit in a vehicle and for engaging a tracker bar affixed to a mounting surface of the vehicle, the tracker bar having a portion extending parallel to the mounting surface, the bar extension system comprising:
   an extension arm extending away from the mounting surface of the vehicle and configured to support the suspended conduit;
   a bracket member coupled to the extension arm and comprising a clamp configured to engage the tracker bar;
   a support arm coupled to the bracket member and angularly extending away from the bracket member and toward the mounting surface of the vehicle; and
   a support member coupled to the support arm and configured to press against the mounting surface of the vehicle,
   wherein the bracket member has an arcuate lip curvedly extending from a guiding portion, the guiding portion and the arcuate lip defining a channel therebetween, within which the clamp engages the tracker bar.

2. A bar extension system for supporting a suspended conduit in a vehicle and for engaging a tracker bar affixed to a mounting surface of the vehicle, the tracker bar having a portion extending parallel to the mounting surface, the bar extension system comprising:
   an extension arm extending in a longitudinal direction away from the mounting surface of the vehicle and configured to support the suspended conduit;
   a bracket member coupled to the extension arm and comprising:
      a clamp extending in a lateral direction and configured to engage the tracker bar;
      a first socket portion extending longitudinally away from the clamp and having a first cavity, the first socket portion being configured to receive the extension arm within the first cavity; and
      a second socket portion projecting away from the clamp and toward the mounting surface of the vehicle, the second socket portion having a second cavity;
   a support arm coupled to the bracket member and configured to be received within the second cavity of the second socket portion; and
   a support member coupled to the support arm and comprising a support plate configured to press against the mounting surface of the vehicle, and further comprising a third socket portion having a third cavity, the third socket portion being configured to receive the support arm,
   wherein the clamp has an arcuate lip curvedly extending from a guiding portion, the guiding portion and the arcuate lip defining a semi-circular channel therebetween, within which the clamp engages the tracker bar.

3. The bar extension system of claim 2, wherein the arcuate lip has a semi-circular cross-sectional profile with an inner diameter that corresponds to an outer diameter of the tracker bar, and
   wherein the arcuate lip is configured to curve around and grip the tracker bar to restrict longitudinal movement of the clamp relative to the tracker bar.

4. The bar extension system of claim 2, wherein an end of the arcuate lip and the guiding portion form a gap therebetween that is less than an outer diameter of the tracker bar to restrict release of the tracker bar from the semi-circular channel without application of an external force along an incline direction of the guiding portion.

5. The bar extension system of claim 2, wherein the bracket member further comprises:
   a first gusset at a junction of the clamp and the first socket portion, and contacting the clamp and opposite sides of the first socket portion to strengthen a connection between the clamp and the first socket portion; and
   a second gusset at a junction of, and contacting, the first and second socket portions to strengthen a connection between the first and second socket portions.

6. The bar extension system of claim 2, wherein the first cavity is cylindrical in shape and has an internal diameter that corresponds to an outer diameter of the extension arm, and
   wherein the second cavity is cylindrical in shape and has an internal diameter that corresponds to an outer diameter of the support arm.

7. The bar extension system of claim 2, wherein the extension arm is coupled to the first socket portion via a first pin passing through a first hole extending through the first socket portion and the extension arm, and
   wherein the support arm is coupled to the second socket portion via a second pin passing through a second hole extending through the second socket portion and the support arm.

8. The bar extension system of claim 2, wherein the first socket portion has a first stopper within the first cavity to limit an insertion length of the extension arm within the first socket portion, and
   wherein the second socket portion has a second stopper within the second cavity to limit an insertion length of the support arm within the second socket portion.

9. The bar extension system of claim 2, wherein the support member further comprises:
   a third socket portion projecting at an angle from the support plate and having a third cavity therein, the third socket portion being configured to receive the support arm.

10. The bar extension system of claim 9, wherein the third cavity is cylindrical in shape and has an internal diameter that corresponds to an outer diameter of the support arm.

11. The bar extension system of claim 9, wherein the support arm is coupled to the third socket portion via a third pin passing through a third hole extending through the third socket portion and the support arm.

12. The bar extension system of claim 9, wherein the support plate is configured to be attached to the mounting surface of the vehicle via a mounting means.

13. The bar extension system of claim 9, wherein the support member further comprises an adhesive-back foam pad attached to a back side of the support plate facing the mounting surface of the vehicle.

14. The bar extension system of claim 2, wherein the bar extension system further comprises an eyelet configured to couple the extension arm to the suspended conduit via a suspender.

15. A bar extension system for supporting a suspended conduit in a vehicle and for engaging a tracker bar affixed to a mounting surface of the vehicle, the tracker bar having a portion extending parallel to the mounting surface, the bar extension system comprising:
   an extension arm extending away from the mounting surface of the vehicle and configured to support the suspended conduit;

a bracket member coupled to the extension arm and comprising:
   a clamp configured to engage the tracker bar;
   a socket portion extending away from the clamp and having a cavity, the socket portion being configured to receive the extension arm within the cavity; and
   a gusset at a junction of the clamp and the socket portion, and contacting the clamp and opposite sides of the socket portion to strengthen a connection between the clamp and the socket portion;
a support arm coupled to the bracket member; and
a support member coupled to the support arm and comprising a support plate configured to press against the mounting surface of the vehicle.

16. A bar extension system for supporting a suspended conduit in a vehicle and for engaging a tracker bar affixed to a mounting surface of the vehicle, the tracker bar having a portion extending parallel to the mounting surface, the bar extension system comprising:

an extension arm extending away from the mounting surface of the vehicle and configured to support the suspended conduit;
a bracket member coupled to the extension arm and comprising:
   a clamp configured to engage the tracker bar; and
   a socket portion extending away from the clamp and having a cavity, the socket portion being configured to receive the extension arm within the cavity, the socket portion having a stopper within the cavity to limit an insertion length of the extension arm within the socket portion, the stopper being a protruding rim within the cavity and configured to abut against the extension arm;
a support arm coupled to the bracket member; and
a support member coupled to the support arm and comprising a support plate configured to press against the mounting surface of the vehicle.

* * * * *